Jan. 3, 1933.  A. L. PARKER  1,893,442
TUBE COUPLING
Filed July 7, 1930
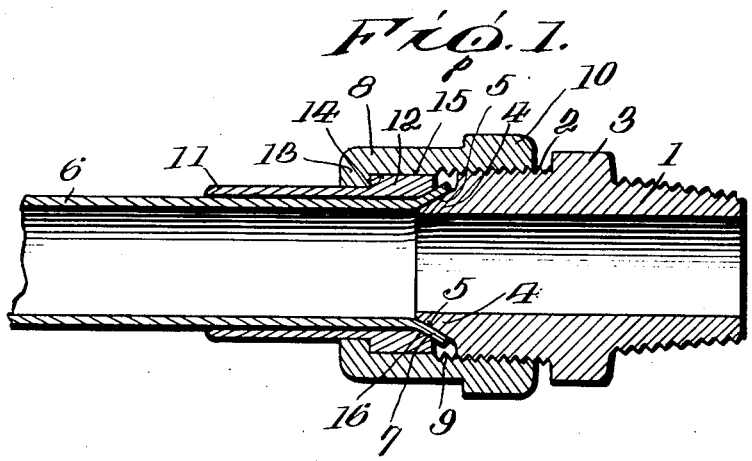
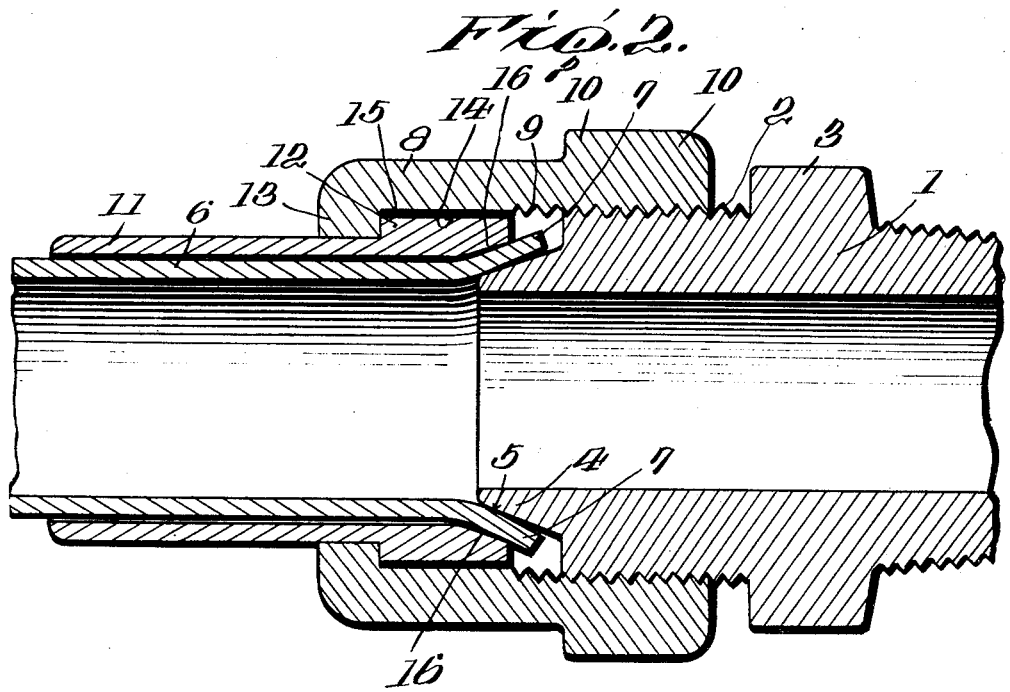
Inventor
Arthur L. Parker
By Sturtevant, Mason & Porter
Attorneys Patented Jan. 3, 1933

1,893,442

UNITED STATES PATENT OFFICE

ARTHUR L. PARKER, OF CLEVELAND, OHIO

TUBE COUPLING

Application filed July 7, 1930. Serial No. 466,283.

The invention relates to new and useful improvements in tube couplings, and more particularly to a tube coupling for clamping the flared end of a tube.

An object of the invention is to provide a tube coupling consisting of a male member and a female member for clamping the flared end of a tube wherein said members are provided with tapered seats and the portions carrying the seats are so dimensioned as to yield to bring about an intimate clamping contact between the tapered seats and the flared end of the tube, and wherein said female member is formed in two sections, one of which has threaded engagement with the male member, and the other of which carries the seat contacting with the outer face of the flared end of the tube and is free from rotation during the final clamping action on the flared end of the tube.

In the drawing:—

Figure 1 is a sectional view through a tube coupling embodying the improvements and showing the members as clamping the flared end of a tube.

Fig. 2 is a similar view but showing the members in their position where they first contact with the flared end of a tube and before the parts are turned so as to bring about a clamping action on the tube end.

The tube coupling embodying the invention consists of a female member and a male member having threaded engagement with each other. The male member is provided with a tapered seat adapted to engage the inner face of the flared end of the tube. The female member is made in two parts and includes a sleeve having threaded engagement with the male member and turning thereon for bringing about a clamping of the tube end. It also includes a sleeve which engages the outer face of the flared end of the tube, and which is pressed against said flared face by the other section of the female member. The tapered seats on the male and female members are initially substantially parallel while the inner and outer faces of the flared end of the tube are at a slight angle to each other due to the thinness of the metal at the outer end of the flare during the forming of said flared end. The parts carrying the seats on the male and female members are so proportioned that during the final clamping action the metal will stretch or yield so as to bring about an intimate contact between the seats on the coupling members and the faces of the flared end of the tube.

Referring more in detail to the drawing the invention as illustrated includes a male coupling member 1 having its outer face threaded as indicated at 2. Said male member is provided with a portion having the faces thereof slabbed so as to serve as a nut for turning or holding said male member. This portion is indicated at 3 in the drawing. The bore of the male member is substantially the same as the bore of the tube to be clamped, and at the inner end of the male member there is a projecting portion 4 having an inclined face 5 which forms the inner tapered clamping seat. This portion 4 is adapted to extend into the flared end of the tube, which tube is indicated at 6 in the drawing. The flared end is indicated at 7. The female member of the tube coupling is formed in two sections. An outer sleeve section 8 is provided with threads 9 adapted to engage the threads 2 on the male member. Said female member is also enlarged and slabbed so as to provide a nut 10 whereby said female member may be turned or held for bringing about the clamping of the tube end. Said female coupling also includes an inner sleeve 11. The inner diameter of this sleeve 11 is substantially the same as the outer diameter of the tube, although a tolerance or clearance may be provided if desired. The inner sleeve 11 has a shoulder 12 and the outer sleeve 8 of the female coupling has a portion 13 which engages this shoulder 12 for forcing the sleeve 11 into clamping contact with the outer face of the flared end of the tube. The outer face 14 of the sleeve 11 is substantially cylindrical, and the inner face 15 of the sleeve 8 is substantially cylindrical. These two faces are of substantially the same diameter with sufficient clearance or tolerance to permit the turning of the outer sleeve 8 on the inner sleeve 11 and easy endwise movement between these parts. The sleeve 11 of the female member is provided with an inclined tapered face 16 which forms the outer tapered seat which engages the outer face of the flared end of the tube. This tapered face 16 and the tapered face 5 are initially substantially parallel.

Both members of the female coupling are placed on the tube, after which the tube end is flared by a suitable flaring tool. The inclined face 16 of the female member serves as a gage for determining the flare of the end of the tube, and therefore the outer face of the flared end of the tube will be substantially at the same angle as the face 16 of the female member. When the female member of the coupling is threaded onto the male member of the coupling the tapered seats are first brought into contact with the inner and outer faces of the flared end of the tube, as shown in Fig. 2 of the drawings. As the parts are then further threaded onto each other the portions of the sleeve 11 radially opposed to the tapered seat 16 are so dimensioned that they will yield outwardly taking up the clearance or tolerance between the inner and outer sleeves of the female coupling so that the outward yielding movement of this section 11 of the female coupling is limited. Then the forces react through the flared end of the tube and the portion 4 of the male member of the coupling will yield so that the tapered seat 5 will enter into intimate contact with the inner face of the flared end of the tube. During the final clamping action the sleeve 11 does not turn with the sleeve 8 of the female member, but is merely forced endwise into tight clamping contact with the flared end of the tube. This avoids the friction incident to the rotation of the clamping members on the outer end during the final clamping thereof and greatly increases the efficiency and tightness of the coupling as it is finally seated in clamping contact with the tube end. This coupling is particularly adapted for heavy duty installations where it is necessary to use heavy tubing and considerable pressure in order to bring about a tight joint between the coupling parts and the tube end.

It is obvious that minor changes in the details of construction and the arrangement of the parts may be made without departing from the spirit of the invention as set forth in the appended claims.

Having thus fully described my invention, what I claim as new and desire to secure by Letters Patent is:—

A tube coupling comprising cooperating male and female members having threaded engagement with each other, said male member having an integral portion provided on its outer face with a smooth uniform tapered seat disposed at approximately an angle of thirty degrees to the longitudinal axis of the coupling and adapted to extend into the flared end of the tube, said female member being formed with inner and outer sleeve sections, said outer sleeve section being threaded so as to engage the threaded portion on the male member, the inner face of the outer sleeve and the outer face of the inner sleeve of the female member being substantially in contact, said inner sleeve having a tapered seat disposed at approximately the same angle as the tapered seat on said male member and adapted to engage the outer face of the flared end of the tube to be clamped, said inner sleeve section of the female member having a shoulder for rotatable engagement with a shoulder on the outer sleeve section thereof, said shoulders being disposed a substantial distance from the tapered portion of the inner sleeve section whereby said outer sleeve section may force the inner sleeve section endwise against the tube for clamping the same against the tapered seat on the male member.

In testimony whereof, I affix my signature.

ARTHUR L. PARKER.